Nov. 7, 1967 A. M. MARKS 3,350,982

LIGHT POLARIZING STRUCTURES

Filed July 21, 1965

INVENTOR.
ALVIN M. MARKS
BY
ATTORNEYS

United States Patent Office 3,350,982
Patented Nov. 7, 1967

3,350,982
LIGHT POLARIZING STRUCTURES
Alvin M. Marks, 166—35 9th Ave.,
Whitestone, N.Y. 11357
Filed July 21, 1965, Ser. No. 473,579
10 Claims. (Cl. 88—24)

ABSTRACT OF THE DISCLOSURE

A light polarizing and controlling structure in the nature of a sheet of fluid or solid suspension of elongated dipole particles, said particles being aligned with their longitudinal axes normal to the major faces of the sheet with radial light polarizers carried on the exterior major face of the sheet and light reflecting means on one of the major faces of the sheet to modify the nature of the light emerging from the structure.

---

This invention relates to light polarizing structures and particularly to light polarizing assemblies capable of transmitting only that light which comes from a selected narrow angular range hereinafter referred to as uniaxial polarizing assemblies and is a continuation-in-part of an application entitled, Light Polarizing Structures, Ser. No. 117,956, filed June 19, 1961, by Alvin M. Marks, now Patent No. 3,205,775 issued Sept. 14, 1965.

In the above mentioned co-pending patent application it was shown that light transmitted by a uniaxial polarizer together with a linear polarizer could be confined to a selected narrow angular range about the normal to the sheet. This performance characteristic has been employed in conjunction with the structures hereinafter described and claimed to provide apparatus particularly suited for use with horizontal viewing devices, daylight projection screens, non-glare illumination, direct view "molecular" venetian blinds for windows and the like.

Accordingly, it is an object of the present invention to control light coming from a source with respect to its angular pattern.

Another object of the present invention is to exclude light from an ambient light source or light coming from a substantial angle to the normal to the plane of the device.

Still another object of the present invention is to control the angular pattern of reflected light for daylight projection screens.

A further object of the present invention is to eliminate the glare component traversing the light polarizing structure in a window panel.

A feature of the present invention is its use of uniaxial polarizers and multi-layer polarizers to provide a controlled light pattern.

A further feature of the present invention is its use of a variable transmission uniaxial polarizer in the nature of an electrically orientable dipole suspension and one or more polarizers to control the pattern of light therefrom.

Still another feature of the present invention is its use of a uniaxial polarizer and a high gain reflecting screen for daylight motion picture projection purposes.

Still another feature of the present invention is the use of the combination of a reflux polarizer, high efficiency, polarized projection beam to project movies or still pictures onto a high gain reflecting screen, and a screen comprising a linear and uniaxial polarizer to provide a selective angular transmission pattern.

The invention consists of the construction, combination and arrangement of parts, as herein illustrated, described and claimed.

In the accompanying drawing, forming a part hereof is illustrated several forms of embodiment of the invention, and in which.

Figure 1:
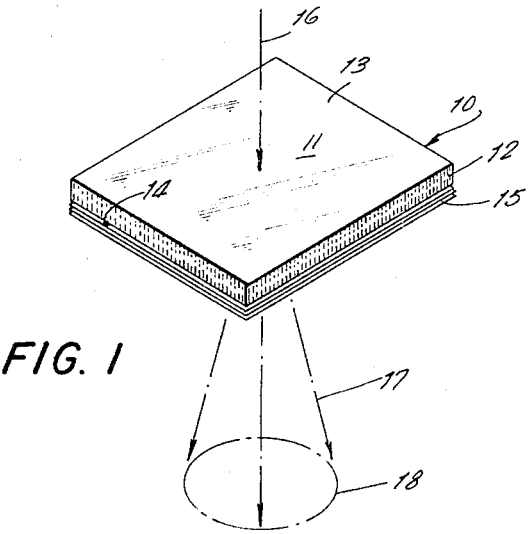
FIGURE 1 is a somewhat fragmentary cross-sectional view of a uniaxial light polarizing assembly made in accordance with the present invention, employing a multi-layer polarizer.

Referring to the drawings and particularly to FIGURE 1, 10 indicates a uniaxial polarizing sheet consisting of a sheet of transparent material 11, having a plurality of light polarizing particles 12, disposed therein. The transparent sheet 11 may consist of any suitable transparent plastic material such as polyvinyl alcohol, polyvinyl butyrate, cellulose acetate, cellulose nitrate or the like. The polarizing particles 12 may be, for example, crystals of herapathite (iodo-quinine-sulphate) or of homolog (iodo-cinchonidine-sulphate) or polarizing rods, known as optical dipoles such as metal rods having a length of $\lambda/3$ and a thickness of about $\lambda/30$ to $\lambda/100$ such as gold, chromium, etc. The polarizing particles 12 are aligned within the sheet 11 so as to lie parallel with adjacent particles and to be disposed in a direction normal to the surfaces 13, 14 of the sheet 11. This orientation is hereinafter referred to as disposed normal to the plane of the sheet.

A plurality of layers of transparent material in which alternate layers are of sharply different indices of refraction, hereinafter referred to as a "multi-layer polarizer" is secured to the bottom face 14, of the uniaxial polarizer 10. The multi-layer polarizer 15 may be made in accordance with the teaching of U.S. Patent No. 2,402,176, or otherwise. Multi-layer polarizers have the unique property of producing radially polarized light, whereas, the plane of polarization of light transmitted by linear polarizers consisting of a sheet of a substantially continuous crystalline film of a transparent high polymeric material containing a light polarizing element, is parallel to its polarizing axis.

It will be seen that light indicated by the arrow 16 in FIGURE 1 emerges from the combined uniaxial polarizer and multi-layer polarizer 15 in a conical pattern indicated by the three dashed lines 17 and the circle 18. The light within the conical pattern is readily transmitted, whereas, the light outside of the conical pattern is strongly absorbed. The angle of the transmission zone can be controlled from 15° to 35° by regulating the number of layers of transparent material within the multi-layer polarizer 15. Alternately, the concentration of elongated light polarizing particles within the uniaxial polarizer 10 may be varied to regulate the angle of the transmission zone. It is to be understood that both the multi-layer polarizer and the uniaxial polarizer can be adjusted for suitable transmission patterns.

Figure 3:
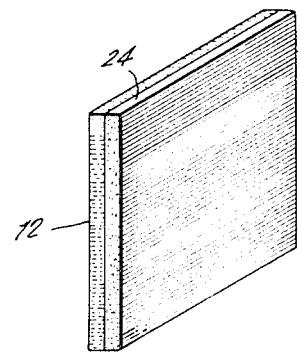
FIGURE 3 is a somewhat diagrammatic cross-sectional view of still another form of uniaxial polarizers in combination with a linear polarizer made in accordance with the present invention.
Figure 2:
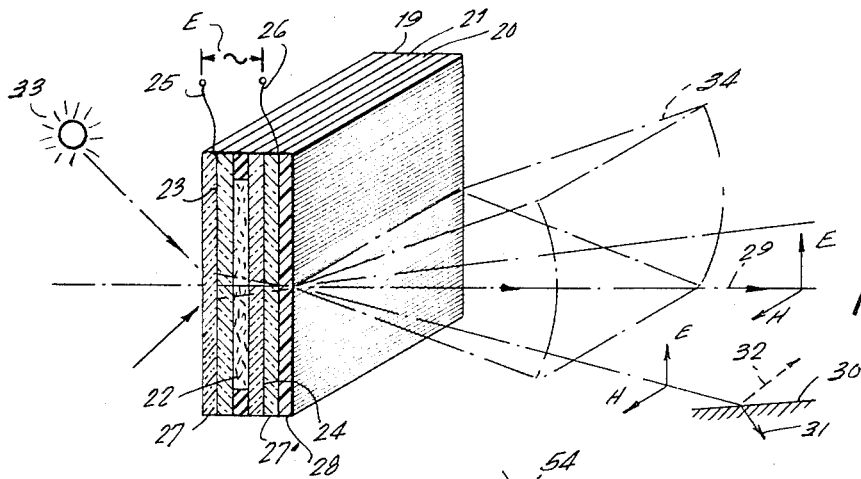
FIGURE 2 is a somewhat diagrammatic fragmentary view of a variable density uniaxial polarizing assembly with the pattern of light indicated by dashed lines.

Referring to FIGURE 2, there is shown another form of uniaxial polarizer which is made in the nature of a cell consisting of spaced flat transparent sheets 19, 20, sealed at their edges by means of a gasket 21, and filled with a fluid suspension of dipole particles indicated at 22. Transparent electrically conductive layers 23, 24, are laminated between glass sheets 19 and 27 and 20 and 27, and connected to a source of electrical potential (not shown) by means of leads 25, 26, so that an electrical field can be applied between the transparent electrodes 23, 24. In this manner, the light polarizing dipolar particles withing the suspension 22 can be aligned more or less parallel to each other and normal to the major surfaces of the transparent sheets 19, 20, to assume the configuration shown in FIGURES 1 and 3. The applied voltage E is usually AC voltage ranging from 5–25 kc. depending on the size of the cell and the inductance of the supply circuit.

Since the transmittance may be varied in the cell from a small value for example, 0.01% to a rather large value of the order of 60%, a wide variety of performance characteristics may be obtained with this structure. If a permanently aligned uniaxial polarizer is substituted for the panel shown in FIGURE 2, the combination has a fixed transmittance. In the variable density panel the density ratio (closed/open) is of the order of 10, 15 or more. Pairs of maximum and minimum transmittance values may be selected by adjusting the thickness of the layer of dipolar material or by the concentration of the dipoles 22, or both. The transmittance in between these values may be adjusted by the amplitude of the AC voltage applied to the terminal of the leads 25, 26.

A linear polarizer 28, is laminated to the face of the variable uniaxial polarizer shown in FIGURE 2 with its electric vector in the vertical plane. The linear polarizer is preferably laminated between the glass sheets on one face of the cell. The result of this structure is to produce the polarized light ray 29, with the electric vector E of polarization in the vertical plane. Such a ray upon striking a horizontal surface such as is indicated at 30, is preferentially refracted into the surface as shown at 31. The surface reflected component 32, is either minimized or eliminated. In this manner, the input of light from the device, which may be employed as a window, produces a nonglare light insofar as the light falls upon the surfaces. Such illumination results in improved visual acuity and better color rendition.

In employing such a structure as a window, bothersome glare from ambient bright sky light or sun (indicated at 33) is blocked out by the window because the overhead light is outside of the transmission zone of the wedge shaped transmittance pattern 34, of the structure. However, other diffused ambient light is transmitted if within the transmission pattern. Thus the window acts as a venetian blind without the troublesome interference common with such devices. In addition, there is no need for the mechanical adjustment of slats employed by such devices.

Figure 4:
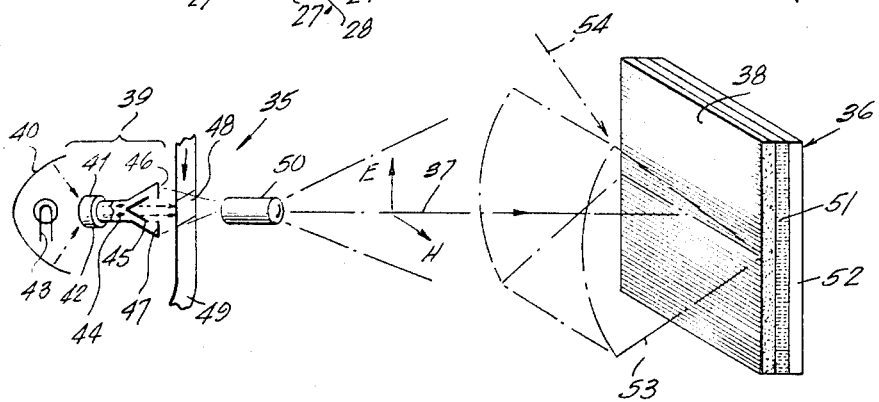
FIGURE 4 is a somewhat diagrammatic representation of a motion picture device showing its use in connection with a uniaxial polarizer reflecting screen.

Referring to FIGURE 4 there is shown still another embodiment of the present invention which is particularly suited for daylight projection of moving pictures or TV screens. In this embodiment either non-polarized or polarized light can be used by the projector 35. However, it is highly desirable to use a light source in the nature of a high intensity light polarizer such as is disclosed in U.S. Patent No. 2,887,566. In this manner, the screen 36 shown in FIGURE 4 will reflect almost as much light as it would with the standard screen which must be in a dark room. For example, if the projected beam 37 were ordinary light, then the polarizer 38 on the screen would transmit about only 40%. However, if the beam 37 is polarized light, with its polarized electric vector in the vertical plane, then the polarizing sheet 38 will transmit about 80% of the incident light. With the above referred to high intensity polarized light source as indicated at 39 in FIGURE 4, 80% of the incident light flux is polarized so that the overall initial transmittance through the polarizer 38 will be 80 times 80, or 64% compared to 40% employing ordinary light, or a gain of 60%.

The projection device shown in FIGURE 4 consists of the light source 43, and the elipsoidal reflector 40, having a light source on one side thereof and a second foci at 41. 42 is a negative concave meniscus lens in which the surface 42 is a sphere having its center radius at foci 41. The concave surface of the lens is an ellipsoidal surface of revolution which renders the ray from the reflector 40 into a parallel beam 44. The parallel high intensity light beam 44 is polarized by the reflux polarizing device 45 which contains the quarter-wave plates 46, 47, so as to render both the transmitted and reflected components of the rays with their polarizing electric vectors in the vertical plane. The light from the reflux polarizing device 45 is directed through the gate 48 of the projection device through which the film 49 passes. The projection lens 50 focuses the image in the gate onto the surface of the screen 36. The surface of the screen 36 is covered by a linear polarizer 38 adjusted for maximum transmission of the vertical electric vector of polarization. Behind the linear polarizer 38 there is a uniaxial polarizer 51, behind which there is a high gain reflecting screen 52, preferably of the metallized type so that the polarization is retained upon reflection.

The high gain reflection pattern is shown as wedge shaped pattern 53, which lies within or coincident with the limits of the wedge shaped transmission pattern 34, of the linear uniaxial polarizer combination shown in FIGURE 2. External light sources such as the sun, ambient illumination etc., produce rays 54, which fall outside of the transmission pattern 53, and are therefore absorbed by the screen. However, within the pattern 53 the efficiently polarized projection light, and the screen combination result in a reflected image of high brightness. Overhead illumination does not interfere with the reflected image coming from the screen 36.

It will be apparent that the foregoing structures provides excellent devices for viewing radar screens, rear projection displays, for use as windows, and for excluding glare and light coming from the sun or sky outside of the transmission pattern of the device.

Having thus fully described the invention, what is claimed as new and desired to be secured by Letters Patent of the United States, is:

1. A light polarizing structure comprising a sheet of transparent material, a plurality of elongated light polarizing particles disposed therein, said particles being in parallel alignment with respect to each other and disposed in a direction normal to the plane of the sheet and a multi-layer polarizer comprising a plurality of light transmitting layers of alternately sharply different indices of refraction, disposed on one of the major faces of the sheet and disposed parallel tot he plane of the sheet.

2. A light polarizing structure comprising spaced sheets of transparent material, a suspension containing a plurality of elongated light polarizing particles disposed therein, said particles being in parallel alignment with respect to each other and disposed in a direction normal to the plane of the sheets, and multi-layer polarizer comprising a plurality of light transmitting layers of alternately sharply different indices of refraction, disposed on one of the major faces of the sheets and disposed parallel to the plane of the sheet.

3. A light polarizing structure comprising spaced sheets of transparent materials, a suspension containing a plurality of elongated light polarizing particles disposed therein, said particles being in parallel alignment with respect to each other and disposed in a direction normal to the plane of the sheets, and a linear light polarizer on one side thereof.

4. A light polarizing structure comprising spaced sheets of transparent materials, a fluid suspension containing a plurality of elongated light polarizing particles disposed therein, and a linear light polarizer on at least one side thereof and means to apply an electrical field across the suspension whereby said particles are brought into parallel alignment with respect to each other and disposed in a direction normal to the plane of the sheets.

5. A light polarizing structure comprising spaced sheets of transparent materials, a fluid suspension containing a plurality of elongated light polarizing particles disposed therein, and a linear light polarizer on at least one side thereof and means comprising spaced transparent electrodes to apply an electrical field across the suspension whereby said particles are brought into parallel alignment with respect to each other and disposed in a direction normal to the plane of the sheets.

6. A light polarizing structure comprising spaced sheets of transparent materials, a suspension containing a plurality of elongated light polarizing particles disposed therein, and a linear light polarizer on at least one side thereof having its polarizing electric vector disposed in a vertical plane and means to apply an electrical field across the suspension whereby said particles are brought into parallel alignment with respect to each other and disposed in a direction normal to the plane of the sheets.

7. A light polarizing structure comprising spaced sheets of transparent materials, a suspension containing a plurality of elongated light polarizing particles disposed therein, said particles being in parallel alignment with respect to each other and disposed in a direction normal to the plane of the sheets, a linear light polarizer on one side thereof and a light reflecting sheet on the side of the transparent sheet sheet opposite the linear light polarizer.

8. A device according to claim 7 in which the reflector is a high gain reflector.

9. A device according to claim 7 in which the reflector is a high gain metal reflector.

10. A daylight projection system comprising in combination, a high intensity polarized light source having its polarized electric vector disposed in a vertical plane, a projection lens to receive light coming from the light source and direct it therethrough, and a screen to receive the light coming from the projection lens, said screen comprising a first sheet of linear light polarizing material, a second sheet comprising transparent material, a plurality of light polarizing particles disposed in said transparent material, said particles being in parallel alignment with respect to each other and disposed in a direction normal to the plane of the sheet and a third sheet consisting of a high gain reflector.

References Cited
UNITED STATES PATENTS

| | | | |
|---|---|---|---|
| 1,918,848 | 7/1933 | Land et al. | 350—154 |
| 2,017,705 | 10/1935 | Sproxton | 350—152 |
| 2,475,921 | 7/1949 | Smith | 350—153 |
| 2,909,972 | 10/1959 | De Lano | 95—4.5 |
| 3,205,775 | 10/1965 | Marks | 350—155 |
| 3,215,038 | 11/1965 | Heller et al. | 350—160 |

NORTON ANSHER, *Primary Examiner.*

RICHARD SHEER, *Assistant Examiner.*